Aug. 6, 1929.  A. B. CROSS ET AL  1,723,330
WELL BORING DRILL BIT
Filed June 18, 1928   2 Sheets-Sheet 1
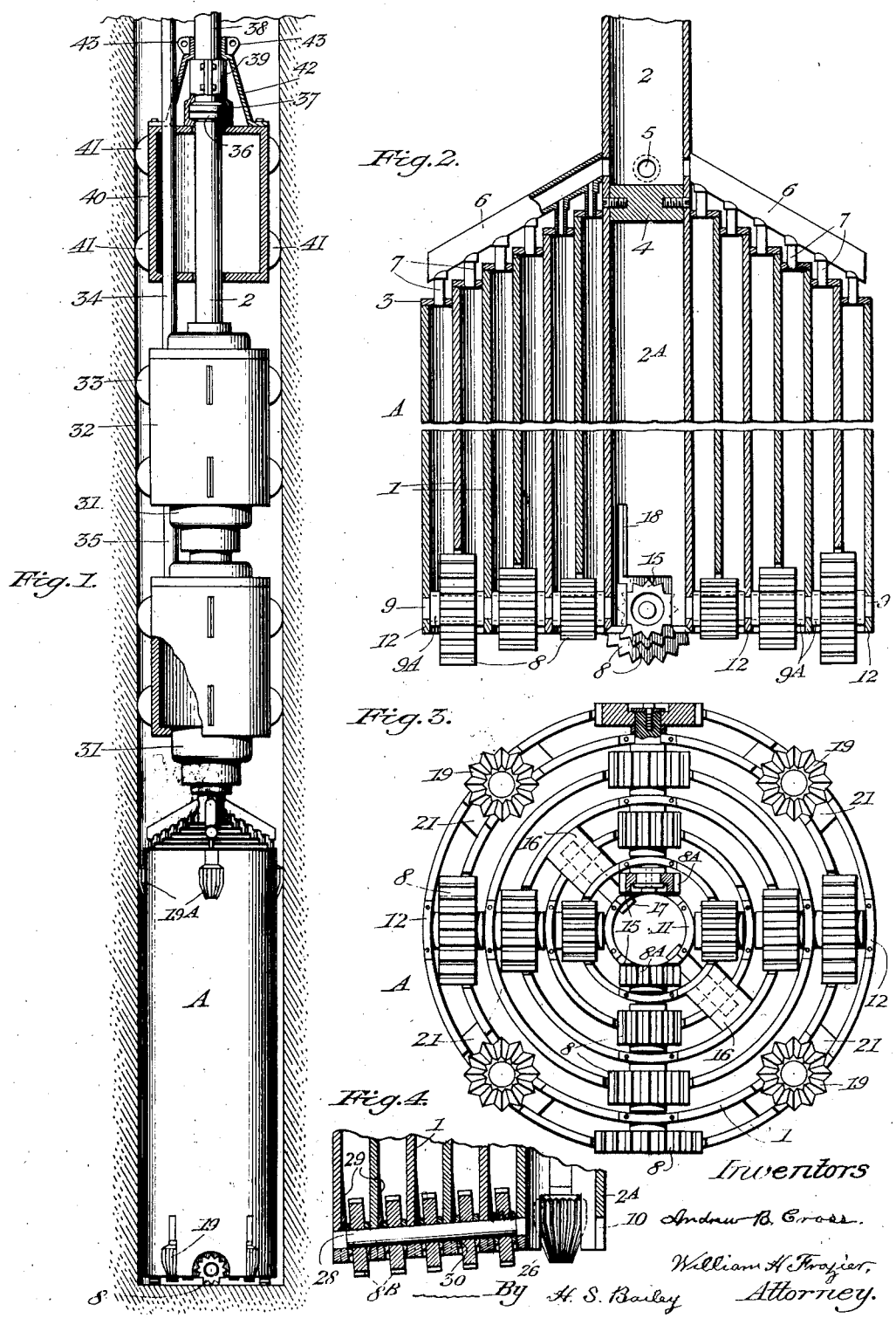

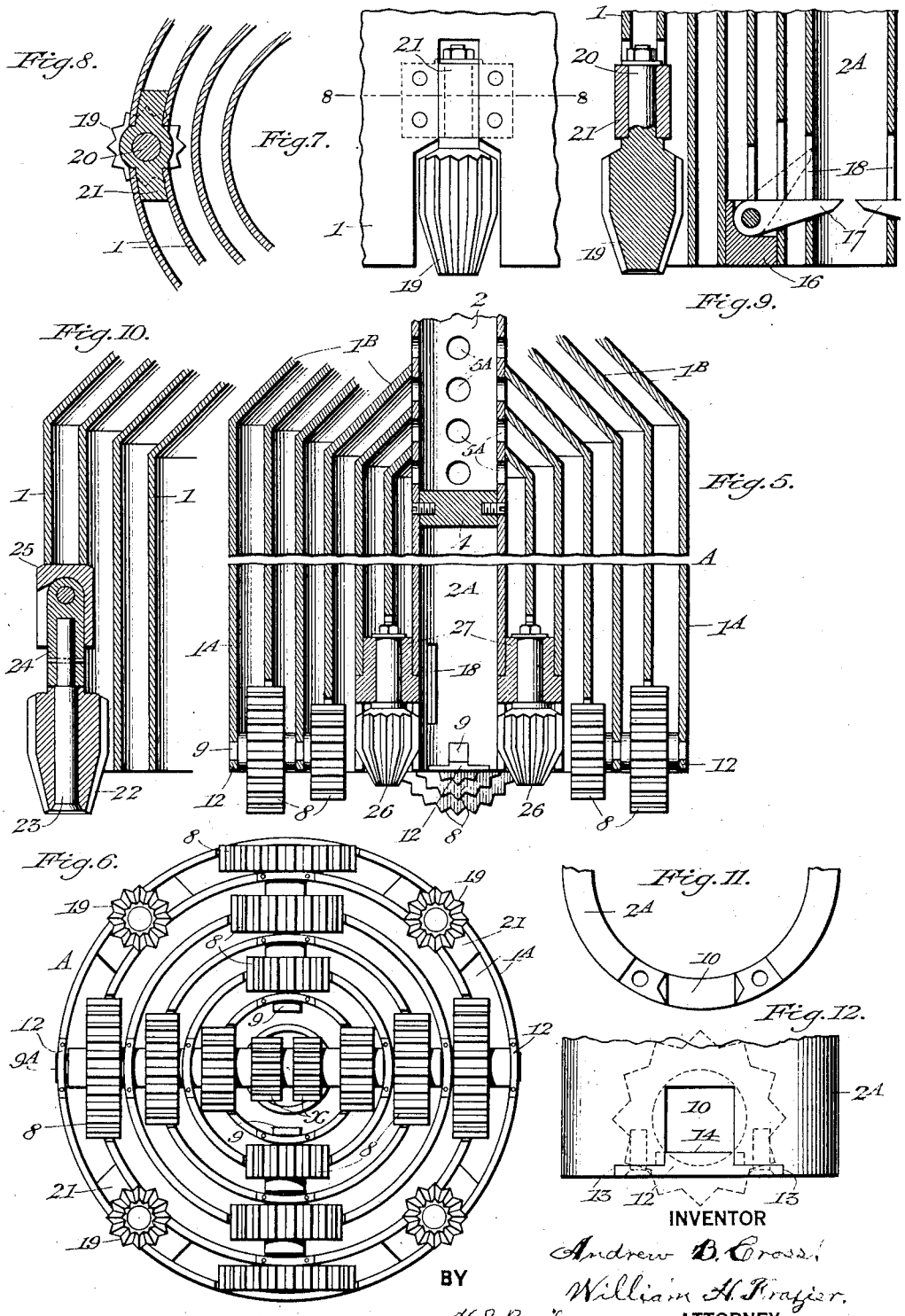

Patented Aug. 6, 1929.

1,723,330

UNITED STATES PATENT OFFICE.

ANDREW B. CROSS AND WILLIAM H. FRAZIER, OF DENVER, COLORADO.

WELL-BORING DRILL BIT.

Application filed June 18, 1928. Serial No. 286,198.

Our invention relates to improvements in well-boring drill bits.

The main object of the invention is to provide a drill, comprising a head which is lighter than drill heads in common use; which is provided with a greater number of rotary cutters which are arranged in sets, the cutters in one set travelling in different paths from those in another set so as to cut away the entire surface represented by the diameter of the head; and in which provision is made for supplying water to the individual cutters.

Further, to provide a drill, comprising a head which is made up of a plurality of spaced connected pipe sections arranged one within the other, the innermost pipe being of much greater length than the others and forming a drill stem for the head, the said stem being connected with the spaces between the pipe sections so as to supply water thereto; rotary cutters being disposed between pairs of the pipes at their lower ends, the rollers being arranged in sets and the rollers of each set being mounted on a common shaft which is adapted to be secured in recesses in the lower end portions of the pipe sections.

Further, to provide a drill of this character, in which the cutters can be arranged either to form a core drill, or to cut away the entire well bottom as in the usual manner.

These objects are accomplished by the character of drill illustrated in the accompanying drawings, in which, Fig. 1 is a vertical sectional view through a well showing the improved drill therein in side elevation, and means for operating the same.

Fig. 2 is an enlarged vertical sectional view through the drill, showing more clearly the manner in which water is supplied to the cutters, the drill being adapted for cutting cores.

Fig. 3 is a bottom view of Figure 2.

Fig. 4 is a fragmental sectional view, showing a slightly different arrangement of the cutters.

Fig. 5 is a vertical sectional view through a core drill, showing a different manner of constructing the drill head, and showing core cutters which rotate on a vertical axis.

Fig. 6 is a bottom view of a drill adapted for cutting away the entire bottom surface of the well hole.

Fig. 7 is a fragmental side view, showing the manner of mounting one of the side cutters or reamers.

Fig. 8 is a sectional view on the line 8—8 of Figure 7.

Fig. 9 is a vertical sectional view, through a portion of the drill head, showing one of the side cutters, and the manner of mounting the core cutters.

Fig. 10 is a similar view, showing one of the side cutters mounted so as to swing outward under centrifugal action.

Fig. 11 is a view of the bottom edge of one of the pipes forming the drill head, showing the recess in which the squared end of one of the cutter supporting shafts is mounted.

Fig. 12 is a side view of Fig. 11, showing the saddle block which holds the end of the cutter shaft in place.

Referring to the accompanying drawings, The letter A designates the improved drill head, which is made up of a plurality of spaced pipe sections 1, arranged one within another and secured together in any suitable manner so as to form a unitary structure. The innermost pipe or drill stem 2 is much longer than the other pipes and constitutes the drive shaft for the cutter head and will hereafter be referred to as the drill stem. In the arrangement shown in all of the figures excepting Figure 4, the lower edges of the pipes are all on the same horizontal plane, and beginning with the outer pipe, they are of progressively increasing length, terminating with the pipe which immediately surrounds the center pipe or drill stem. In the construction shown in Figures 1 and 2, this progressive increase in the length of the pipes forms a stepped arrangement at their upper ends at an inclination of about forty-five degrees, and a flat ring 3 rests upon the edge of each pipe and tightly surrounds the next larger pipe, and these rings 3 are each welded to the pipe upon which it rests and to the pipe which it surrounds. In the case of a core drill, the head is made long enough to receive a core of the required length, and this length is defined by a block 4, which is secured in the drill stem 2 on a plane corresponding to the top of the pipe immediately surrounding the said stem, the part of the stem 2, below the block 4, forming the core receiver or barrel 2ᴬ. The stem 2 is provided with four equi-distant holes 5, which are positioned immediately above the block 4 and the inner ends of pipes 6 are welded to the shaft 2, so as to surround the holes 5, and the pipes 6 extend out over the top of the head and at a corresponding inclination thereto. The pipes 6 are either provided with or formed with nipples 7, the ends of which fit tightly in holes in the flat rings 3, and by this arrangement, water, which is supplied through the shaft 2, passes through the holes 5, pipes 6, and nipples 7, to the spaces between the pipe sections 1 and thence to the bottom of the hole being drilled.

The lower end of the drill head is provided with two rows of rotary cutters 8, the axes of which are at right angles and pass through the center of the stem 2, and these cutters are arranged in four groups of three or more cutters each, three cutters being shown in each group, in Figures 2 and 3, and the cutters may all be of the same diameter, or they may increase in diameter from the inner to the outer cutter of each group, as shown in Figures 2 and 3. The cutters are in the form of toothed wheels or rollers and the cutters of each group are rotatably mounted on a shaft 9, having squared portions which fit in corresponding recesses 10 in the ends of the pipe sections, and are held therein by saddle blocks 12, the end portions of which fit in shallow recesses 13 in the ends of the pipes on each side of the recesses 10, so as to lie flush with the lower end of the pipe as will be understood by reference to Fig. 12. These saddles have projecting portions 14, which extend into the recesses 10 and against the squared portion of the shaft and the end portions of the said projecting portions 14, have a tongue and groove connection with the side walls of the grooves 10, as shown. As shown in Figures 2 and 3, the end of every other pipe section is cut away or recessed to receive the cutters, and the corresponding cutters in two alined groups of cutters travel in the same path, but the cutters in one diametrical line travel in different paths from the corresponding cutters in the other diametrical line, whereby the entire surface beneath the head, excepting the core, is cut away, the cutters being thick enough for that purpose. The core is formed in the following manner:—

The inner rollers 8ᴬ of two alined groups, are positioned so that their inner faces travel in a circle which coincides with the inner face of the core-receiving barrel 2ᴬ of the drill stem 2, the core barrel being cut away for that purpose, as shown at 15 in Figures 2 and 3. Thus, as the head rotates, all the surface beneath it is cut away, excepting the central portion or core, which is formed by the cutters 8ᴬ, and projects into the core barrel 2ᴬ, of the shaft 2 as the head moves downward. When a full length core is completed, it is severed and removed in the following manner:—Diametrically opposite blocks 16 are secured in the lower end of the head, preferably between the second and fourth sections from the stem and in these blocks are pivotally mounted gravity cutting dogs 17, which have an up and down swinging movement in the blocks 16, and when in horizontal positions are each long enough to extend half way across the core barrel, the said core barrel being provided with slots 18, through which the dogs can swing. When the core is forming, the dogs are swung back to inoperative positions by engagement with the core, but when the core is completed, upward movement of the drill while rotating, will cause the points of the dogs to cut into the core, and as the drill is slowly lifted, the dogs will continue to cut and at the same time will move toward horizontal positions until the core is finally severed, and rests upon the dogs so that it is lifted out of the hole with the drill. As the drill is lifted, while the core is being severed, a space will be made between the upper end of the core and the block 4, and when the drill is lifted out of the hole, the core may be removed by first pushing it up against the block 4, when the dogs 17 may be swung back out of the core tube, thus permitting the core to drop out.

In order that the drill may have sufficient clearance, so as not to bind when in operation or when it is being withdrawn from the hole, reamers 19 are mounted in the lower end of the drill head, which project beyond the peripheral surface of the drill and thus ream a hole of greater diameter than the drill, as the drill descends. These reamers are shown most clearly in Figures 7, 8, and 9, and comprise vertically disposed cutters, the lower portions of which are tapered, as shown, and their upper ends terminate in stems 20, which are pivotally mounted in bearing blocks 21, which are inserted between the outer pipe section 1 and the adjoining section, and are secured in place by bolts or rivets. Similar reamers 19ᴬ may also be mounted in the upper end of the drill head, as shown in Fig. 1. In Fig. 10, is shown a reamer 22, which is adapted to swing outward under centrifugal action. To accomplish this, the reamer is pivotally mounted on a stem 23, the upper portion of which is secured in a support 24, which has a swinging connection with a block 25, which is secured in the drill head in the same manner as blocks 21 previously described. In Fig. 5 is shown a change in the construction of the head. In this arrangement, the upper ends of the drill head sections 1ᴬ are contracted into conical form, as at 1ᴮ, a hole being left in the apex of each section of a diameter corresponding to that of the drill stem, and the sections are welded to the stem at these points. The stem in this arrangement is provided with holes 5ᴬ which register with the spaces between the conical portions 1ᴮ of the pipe sections, so that water supplied to the drill stem will pass to the spaces between the head section and thence to the bottom of the hole. In this view, the core-forming cutters 8ᴬ are dispensed with, and cutters or reamers 26, similar to the reamers 19, are employed and are mounted in blocks 27, similar in all respects to the blocks 21, before described. All of the cutters 8 in the several views are held against sliding movement on the shafts, by washers 9ᴬ, which are placed upon the shafts between the cutters and the pipe sections.

In Figure 4 is shown a modification in which cutters 8ᴮ are mounted on an inclined shaft 28, which is secured in the cutter head in the same manner as described in connection with the shafts 9. The cutters 8ᴮ are narrower than the cutters 8 and one of these cutters is positioned between each two pipe sections. Tapered or wedge-shaped spacing strips 29 are welded to the inner faces of the pipe sections, and the inner faces of these strips lie parallel with the adjacent faces of the cutters, and washers 30 are placed upon the shaft 28 on opposite sides of the cutters. As these cutters stand at an inclination, their corner edges will first engage the surface to be cut away and thus facilitate the cutting action.

In Fig. 6 is shown a drill adapted for ordinary well drilling, and in this arrangement, the same character of cutters are used, as are shown in Figures 2 and 3, and they are mounted on shafts 9 and 9ᴬ, which are secured in the drill head in the manner previously described; the only difference being that the shaft 9ᴬ extends entirely across the drill head and upon its center portion are mounted two cutters x, which cut away the center portion of the bottom of the hole or well, the other cutters 8 removing the remaining surface. In other respects, the construction of this drill may be as that shown either in Fig. 2 or Fig. 5, which constructions have been previously described.

The improved drill may be operated in the usual manner, but preferably by steam or compressed air operated turbines 31, which are mounted upon the drill stem 2 of the drill head. As the turbine forms no part of the present invention, a detailed description of the same is deemed unnecessary. The turbines or motors are encased in jackets 32, having fins 33, which engage the wall of the hole as the drill descends and thus prevent the body of the turbine from turning, while the rotor of the turbine, which is secured to the shaft 2, may rotate freely. A supply pipe 34 extends from the upper motor to a steam or air supply, and the exhaust from the upper motor passes through a pipe 35 to the lower motor. The drill stem conveys water to the drill head, and the upper end of this stem terminates in a flange 36, and the flanged end 37 of a short section of pipe 38, is connected to the flanged end of the stem, by a coupler 39, which is made of two half round sections which are bolted together, the sections having enlarged recesses to receive the flanges 36 and 37, thus coupling the pipe section 38 and the drill stem together, but so as to permit free rotation of the stem 2. A flexible hose—not shown—is attached to the pipe section 38 and extends up through the well to a water supply. A guide 40 surrounds the upper end of the drill stem, and is in the form of a hollow cylinder having holes in its opposite ends through which the stem passes, and holes through which the supply pipe 34 passes, and the guide is formed with fins 41 which engage the wall of the well and prevent the guide from turning. The upper end of the guide abuts against the lower end of the coupler 39. A hollow bell-shaped member 42 is bolted to the top of the guide 40 and its upper end tightly surrounds the pipe section 38, and this end of the member is provided with apertured ears 43 to which a lifting cable may be secured.

If the drill is operated in the usual manner, the drill stem is extended by the addition of coupled sections as the hole progresses in depth, but if operated as illustrated in Fig. 1, the drill stem extends only a relatively short distance above the upper end of the drill head, to receive the motors, and a hose is connected to the stem, as above set forth.

In operation, if a core drill is used, the same is lowered into a previously drilled hole, and set in motion, and at the same time, water is supplied through the drill stem, and, if the style of drill shown in Fig. 2 is used, the water passes through the holes 5 in the stem, to the distributing pipes 6, and through the nipples 7 to the spaces between the drill head pipe sections. If the form of drill shown in Fig. 5 is used, the water passes through holes 5ᴬ immediately to the spaces between the pipe sections, and in either case, the water flows directly down upon the cutters. When a full length core is formed, the head is withdrawn and the core removed therefrom, and the operation is repeated as often as may be required. When the drill shown in Fig. 6 is used, it is withdrawn only in case of accident or for replacing worn cutters with new ones. The reamers 19 and 19ᴬ will assure ample clearance for the drill head, both while in operation and when the same is withdrawn from the well. As the cutters are arranged in groups and the cutters of each group are mounted on a single shaft, which can be easily removed, the matter of removing worn cutters and replacing them with new ones, can be easily and quickly accomplished.

Having described our invention, what we claim as new and desire to secure by Letters Patent, is:—

1. In a drill of the character described, a hollow drill stem, a head mounted thereon, comprising a plurality of spaced, connected tubular sections, arranged one within another, a block in said stem at a point corresponding with the top of the head, the stem having outlet holes above said block, which communicate with the spaces between the said tubular sections, radial shafts removably secured in the lower end of the head, having rotary cutters thereon, the cutters on one radial shaft travelling in a different path from those on the adjoining shafts, and rotary cutters in the lower end of the head between each two radial shafts, which travel in a path of greater diameter than that of the head, said latter cutters having vertical axes.

2. In a drill of the character described, a hollow drill stem, a head mounted thereon, comprising a plurality of spaced, connected, tubular sections arranged one within another, a block in said stem on a plane with the top of the head, the stem having outlet holes above said block, which communicate with the spaces between said tubular sections, the portion of the stem below the block constituting a core barrel, opposite blocks in the lower end of the head, adjacent the core barrel and gravity cutting dogs pivotally mounted in said blocks and adapted to swing out into the core barrel through slots in said barrel, radially disposed shafts in the lower end of the head, having rotary cutters thereon, those on one shaft travelling in a different path from those on the adjoining shafts, two diametrically opposite cutters being core forming cutters, said gravity dogs being in inoperative positions during the core forming operation.

3. The combination with a hollow drill stem, of a head thereon, comprising spaced tubular sections arranged one within another and secured upon said stem, said sections having recesses in their lower edges in radial alinement, shafts having squared portions which enter said recesses and saddle blocks which are secured in the ends of said sections to hold said shafts in place, said shafts having rotary cutters thereon, a block in said stem on a plane with the top of the head, said stem having holes above said block which communicate with the spaces between said sections, and cutters in the periphery of said head which travel in a path of greater diameter than that of the head.

In testimony whereof, we affix our signatures.

ANDREW B. CROSS.
WILLIAM H. FRAZIER.